UNITED STATES PATENT OFFICE.

BERNHARD HEYMANN AND ALFRED HERRE, OF ELBERFELD, GERMANY, ASSIGNORS TO THE FARBENFABRIKEN OF ELBERFELD COMPANY, OF NEW YORK, N. Y.

MONOACETYL-INDOXYL AND PROCESS OF MAKING SAME.

SPECIFICATION forming part of Letters Patent No. 657,539, dated September 11, 1900.

Application filed September 28, 1899. Serial No. 731,974. (Specimens.)

*To all whom it may concern:*

Be it known that we, BERNHARD HEYMANN and ALFRED HERRE, doctors of philosophy, chemists, residing at Elberfeld, Germany, (assignors to the FARBENFABRIKEN OF ELBERFELD COMPANY, of New York,) have invented a new and useful Improvement in the Manufacture of Monoacetyl-Indoxyl; and we hereby declare the following to be a clear and exact description of our invention.

In the specification to Letters Patent No. 618,096, dated January 24, 1899, the production of a diacetyl derivative of indoxyl having, most probably, the formula

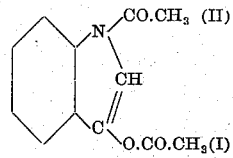

has been described. We have now found that the acetylic group (I) which is bound to the oxygen atom can be split off much more easily by the action of saponifying agents than that acetylic group (II) which is bound to the nitrogen, and we have further succeeded in finding a saponifying process by means of which it is possible to split off the acetylic group (I) exclusively monoacetyl indoxyl of the probable formula

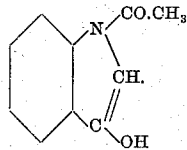

(which was unknown up to the present time) being produced. According to our researches this result is obtained by using such saponifying agents as are acting in a moderate manner—for instance, by employing sodium bisulfite, sodium sulfite, sodium phosphate, or the like agents acting in the same or in a similar manner.

In carrying out our new process practically we can proceed as follows, the parts being by weight: A mixture prepared from ten parts of carefully-pulverized diacetyl indoxyl and a solution of fifteen parts of sodium sulfite in two hundred parts of water is heated at about 70° centigrade while being continuously stirred. By means of this operation the diacetyl indoxyl is by and by dissolved while the monoacetyl indoxyl begins to separate in the shape of glittering needles. When the precipitate thus obtained no longer increases, the liquid is caused to cool the monoacetyl indoxyl, which is difficultly soluble in cold water, being nearly entirely separated in a pure state. It is finally filtered off, pressed, and dried. The new body thus obtained is a white crystalline powder and melts at 135° centigrade. It is easily soluble in boiling water, in alcohol, and in a cold diluted caustic soda-lye. On heating the caustic alkaline solution or on allowing the same to stand for a time the monoacetyl-indoxyl is entirely saponified, indoxyl being produced, which can be transformed in the usual manner into indigo. The monoacetyl indoxyl can therefore be employed for the production of indigo.

Having now described our invention and in what manner the same is to be performed, what we claim as new, and desire to secure by Letters Patent, is—

1. The process for the production of monoacetyl-indoxyl, which process consists in first heating diacetyl-indoxyl with a saponifying agent acting in a moderate manner, and secondly isolating the monoacetyl-indoxyl thus produced from the reaction mixture, substantially as hereinbefore described.

2. As a new article of manufacture the new monoacetyl-indoxyl having most probably the formula:

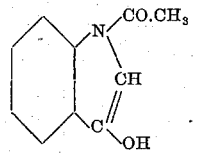

being when dry and pulverized a white crystalline powder melting at 135° centigrade, easily soluble in boiling water, in alcohol and in a cold dilute caustic soda-lye, yielding indigo when heated with alkalies and subsequently treated with atmospheric air, substantially as hereinbefore described.

In testimony whereof we have signed our names in the presence of two subscribing witnesses.

BERNHARD HEYMANN.
ALFRED HERRE.

Witnesses:
R. E. JAHN,
OTTO KÖNIG.